G. B. NEWTON.
TRACE END CARRIER.
APPLICATION FILED FEB. 6, 1919.
1,313,499.
Patented Aug. 19, 1919.
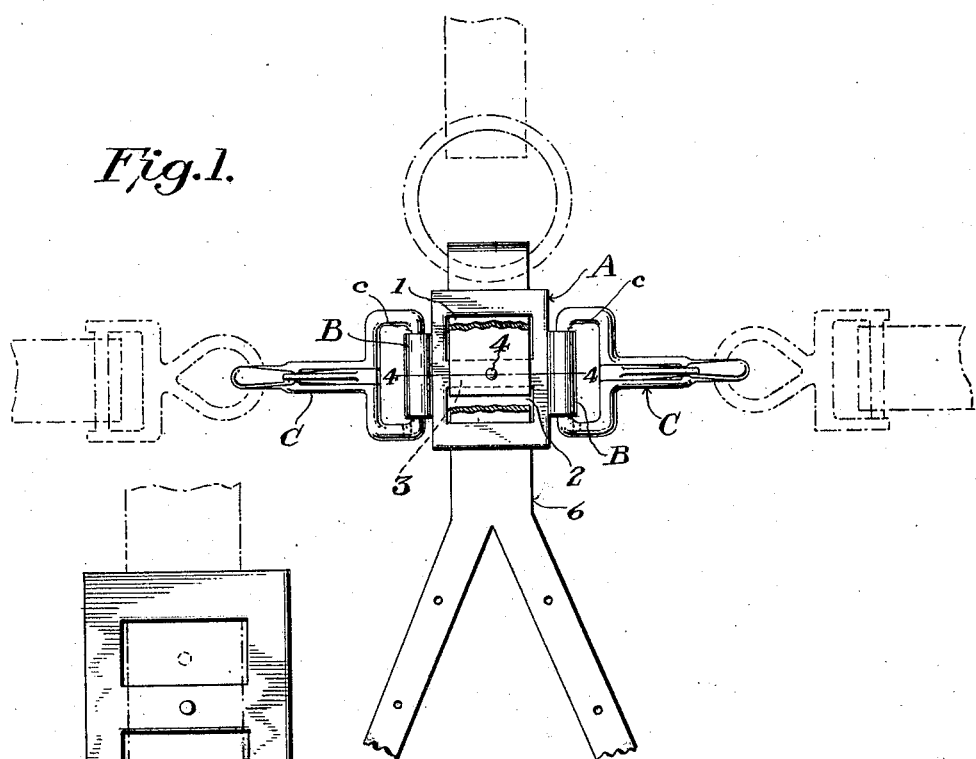
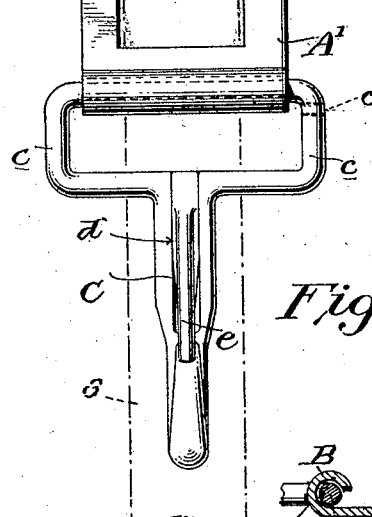
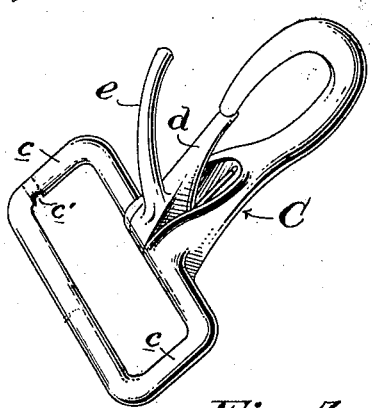
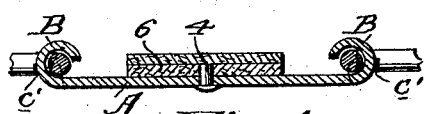
Witnesses
Inventor
George B. Newton.
By J. Walter Fowler, Jr.
Attorney
THE COLUMBIA PLANOGRAPH CO., WASHINGTON, D. C.

UNITED STATES PATENT OFFICE.

GEORGE B. NEWTON, OF HADDAM, KANSAS.

TRACE-END CARRIER.

1,313,499.  Specification of Letters Patent.  Patented Aug. 19, 1919.

Application filed February 6, 1919. Serial No. 275,395.

*To all whom it may concern:*

Be it known that I, GEORGE B. NEWTON, a citizen of the United States, residing at Haddam, in the county of Washington and State of Kansas, have invented certain new and useful Improvements in Trace-End Carriers, of which the following is a specification.

My invention relates to certain new and useful improvements in trace end carriers, and is designed to be used as part of a horse harness for attaching the eyes or tugs of loose traces when hitching or unhitching a horse.

The primary object of the invention is the provision of a simple but effective device upon which the trace ends may be hung for convenience, and which is inexpensive in production, and not likely to become deranged or broken in use.

Other objects of the invention are the provision of a device of the character mentioned on which the harness lines will not catch, which may be mounted on the type of harness now in use without serious trouble, and in which the snap-hook or part of the device directly receiving the eyes or tugs of the traces is readily removable should it break, so as to be replaced by a new like part.

With the above and other objects in view, my invention consists in certain novel combinations and arrangements of parts as will be hereinafter described and claimed.

In the drawings, Figure 1 shows a plan view of a double trace and carrier embodying my invention, showing individual snap-hooks each adapted to receive one of the trace ends. Fig. 2 is a modification showing a trace carrier provided with a single snap-hook. Fig. 3 illustrates the snap-hook which I prefer to use with my device. Fig. 4 is a sectional view of the plate showing the ends of the snap hooks in position.

In Fig. 1, wherein is illustrated one form of my invention, the carrier consists of a plate, A, of sheet-metal or otherwise, of substantially square or rectangular design, said plate being formed with openings, 1, 2, and an intermediate cross-bar, 3, from which latter rises a stud or pin, 4, said plate being normally formed with an extension along its opposite side edges and said extension being subsequently turned upwardly and inwardly to form the substantially long tubular bearing B. The free edges of these curved or tubular portions terminate a sufficient distance above the top surface of the plate to form slots or openings which in fact serve as entrances into the tubular bearings and permit the ready insertion and removal of the loops or eyes of the snap-hooks, C, said snap-hooks having the cross-bars, c, of their loops or eyes grooved on one or both sides to facilitate the ready removal of the snap-hooks, in the event of the hook being broken, and the substitution of another hook.

The snap-hooks may be of any well known form, but for reasons hereinafter stated, I prefer for my purpose the style of hook shown in Fig. 3, namely, one wherein the usual spring-tongue, d, is formed or provided with a rounded or curved horn or projection, e, which extends above the tongue and may overhang the latter, said horn by reason of its location and construction, facilitating the depression of the tongue of the snap-hook even by a party wearing heavy gloves, and thereby making easier the attachment and removal of the tugs or eyes of the trace ends. The curved or rounded surface of the horn prevents the harness reins catching in the snap-hooks.

In attaching the device of Fig. 1, said device is located over the rump of the animal, and the crupper strap, 6, is passed upwardly through one of the slots of the plate, A, and over the cross-bar, 3, and thence through the other side of the plate, it being understood that one of the usual holes in the strap will engage the stud or pin, 4, in the well known manner. The bight of the crupper strap may be engaged by a ring on the back strap of the harness, as shown by dotted lines. The device of Fig. 1 is of a double character; that is, it has a tubular bearing on two of its side edges and each of these bearings is provided with a snap-hook.

In Fig. 2, another and a single type of device is shown wherein the plate, A', has the tubular bearing on only one of its edges; otherwise the arrangements of parts is substantially as before described. In using the single type of device of Fig. 2, two of the plates, A', will be used, one attached to the hip strap on each side of the horse's rump, and each of the plates will serve for the attachment of one of the traces, one of which will be attached at the right and the other at the left side of the horse, and the points of attachment for the traces will be sufficiently low on the animal that a short man or boy may attach and detach the trace ends without difficulty.

Having described my invention, what I claim as new and desire to secure by Letters Patent is:

1. A trace end carrier consisting of a slotted plate formed with a side edge extension, said extension being curved upwardly and inwardly to form a long tubular bearing, and a snap-hook detachably fitted to said bearing and adapted to receive a trace end, said snap-hook having a grooved cross-bar and the free edge of the tubular bearing terminating a sufficient distance above the top surface of the plate to form an opening adapted to freely admit said grooved cross-bar when alined with the groove thereof.

2. A trace end carrier consisting of a slotted plate of substantially rectangular form adapted to be supported on the rump of the animal, said plate having extensions on opposite sides each of said extensions being curved upwardly and inwardly to form a long tubular bearing the free edge of which terminates a short distance above the plate, and a snap-hook detachably fitted to each of said bearings and adapted to receive a trace end, each of said snap-hooks having a cross-bar with a groove therein adapted when the snap-hook is turned over to register with the end of the tubular bearing and to allow the snap-hook to be removed from and attached to the plate by an endwise movement, said plate having a cross-bar intermediate of its ends and provided with a projecting stud.

In testimony whereof I affix my signature.

GEORGE B. NEWTON.

Copies of this patent may be obtained for five cents each, by addressing the "Commissioner of Patents, Washington, D. C."